Nov. 26, 1963
R. W. RUGENSTEIN
3,111,877
ADJUSTABLE CUTTING DIE
Filed May 29, 1961
3 Sheets-Sheet 1
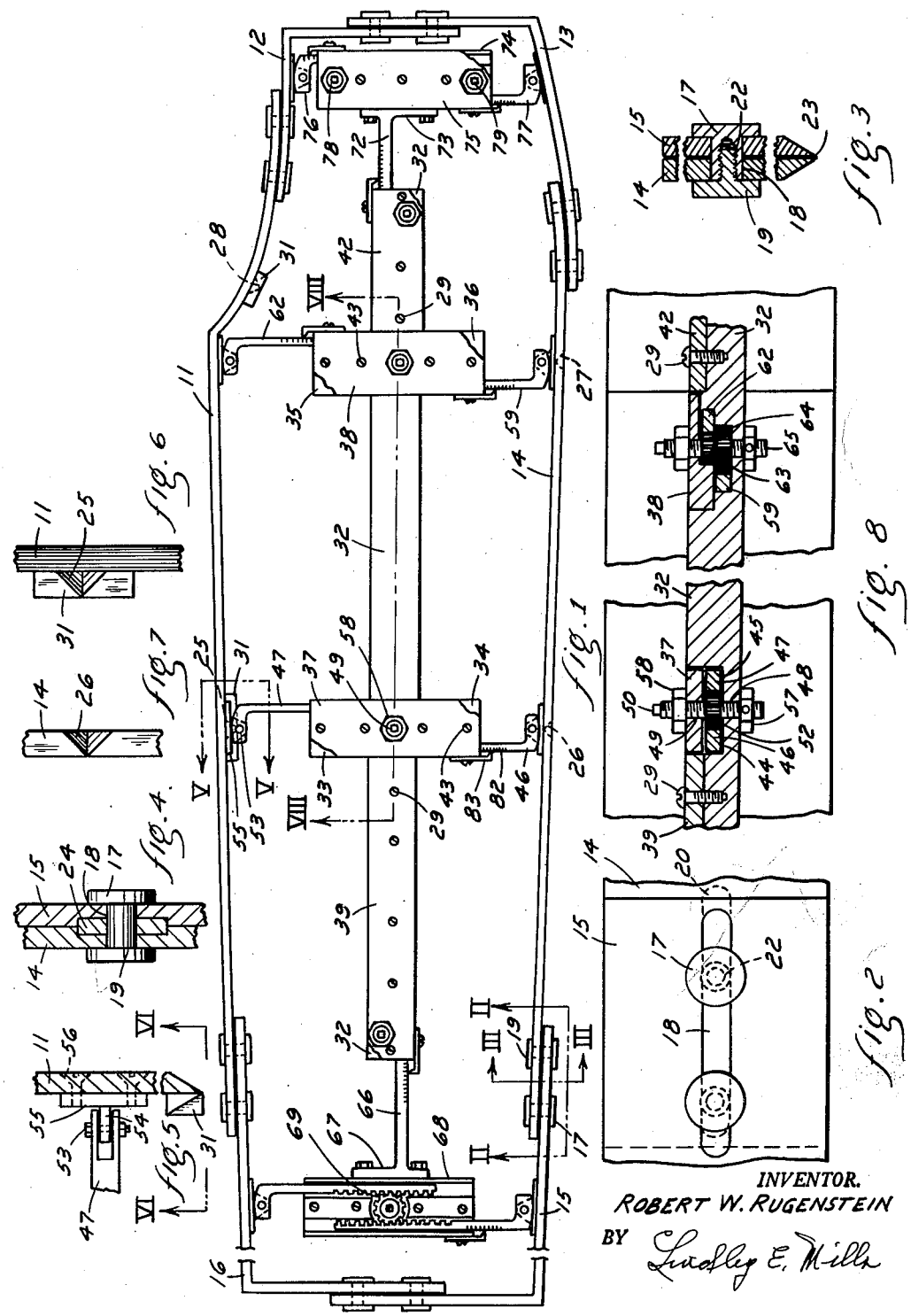
INVENTOR.
ROBERT W. RUGENSTEIN
BY

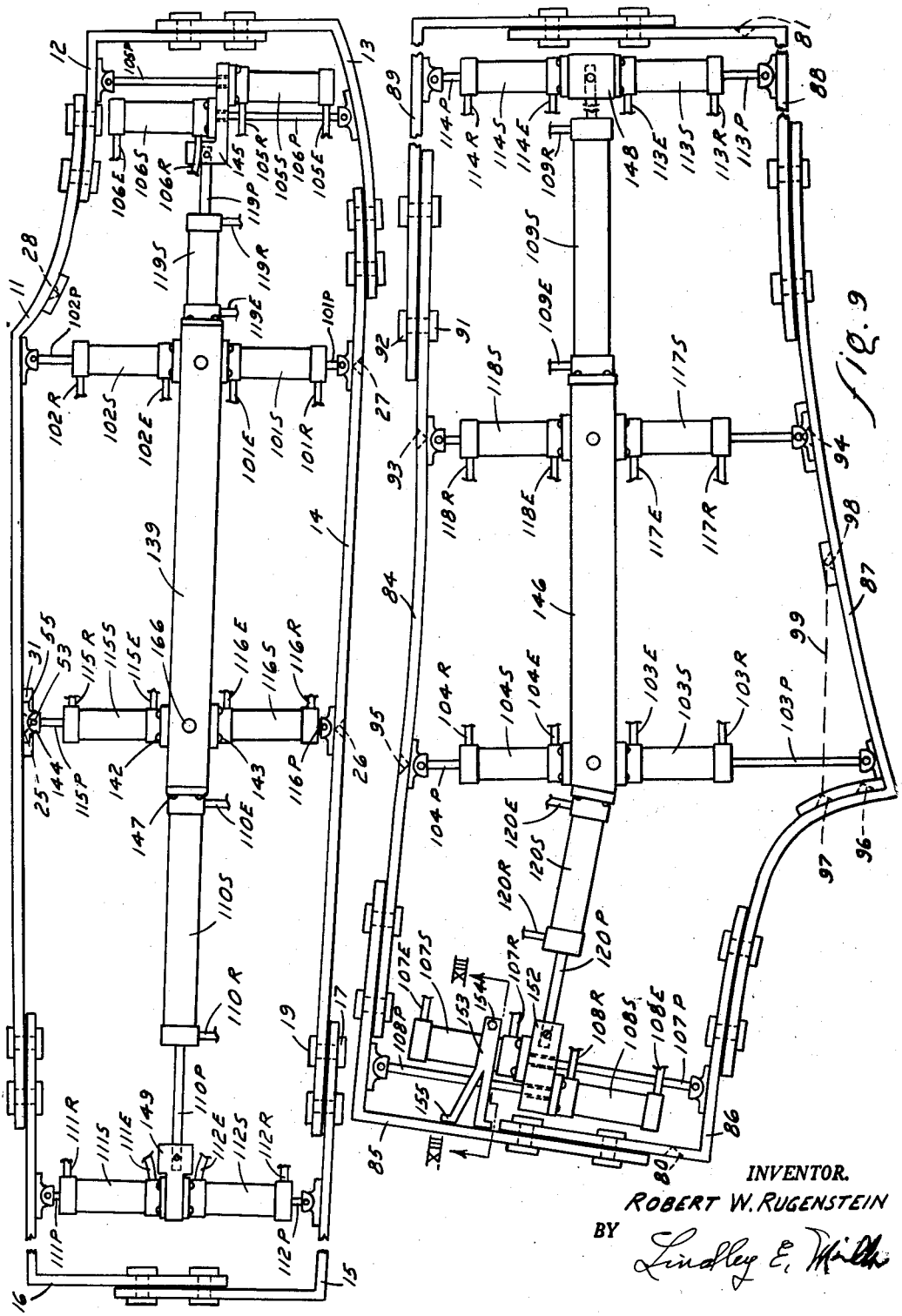

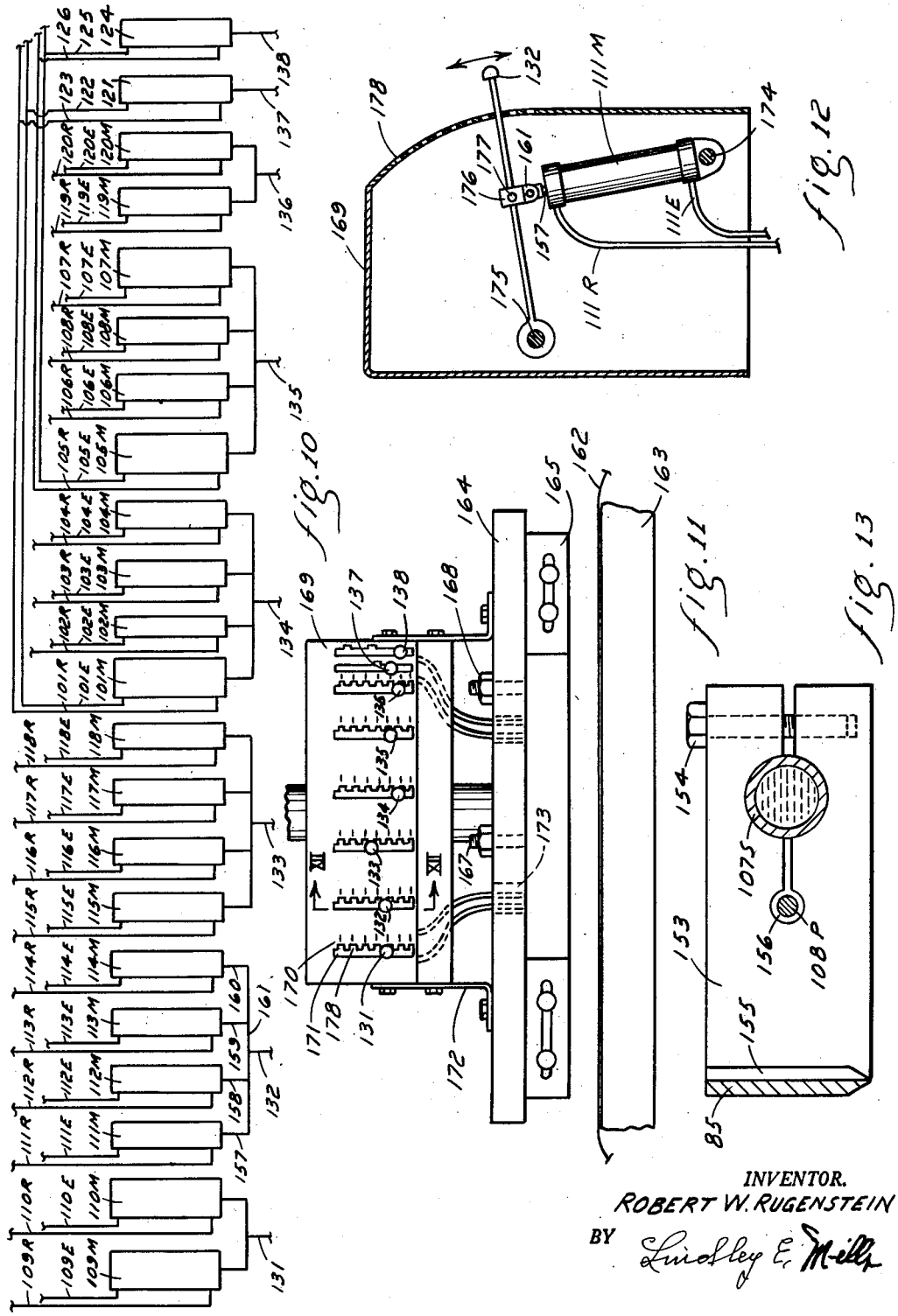

United States Patent Office 3,111,877
Patented Nov. 26, 1963

3,111,877
ADJUSTABLE CUTTING DIE
Robert W. Rugenstein, Kalamazoo, Mich.
(7915 Reed's Road, Shawnee Mission, Kans.)
Filed May 29, 1961, Ser. No. 113,515
7 Claims. (Cl. 83—657)

This invention relates to an adjustable cutting die for fabric and other sheet material, particularly to a die useful in cutting irregularly shaped pieces of sheet material, which is adjustable to enable the dimensions of the cut pieces to be varied essentially independently of one another.

Many manufacturing operations involve the cutting of accurately dimensioned pieces from fabric or other sheet material. Among such operations is the manufacture of men's suits and other clothing. One step in making men's trousers, for example, is the cutting of four pieces of cloth which, in the finished trousers, comprise the front and back panels of each trouser leg extending from the cuff upward to the waistband, these parts often being referred to as the right and left "foreparts" and the right and left "backparts," respectively, of the trousers. These are then sewed together after which the pocket flaps and other previously cut smaller pieces are attached to finish the trousers. Men's coats, vests and many ladies' garments are manufactured following the same general procedure of first cutting the properly shaped pieces of cloth and then sewing them together in the proper way. Other articles made from sheet materials are often fabricated following the same general procedure.

In some instances the pieces required to be cut from sheet material are regular in shape, e.g. rectangular or square, and the cutting thereof offers no particular difficulty. In many other instances, however, especially in the manufacture of clothing, the pieces required to be cut from sheet material are quite irregular in shape and can be cut in practical fashion only by following the outline of a previously prepared properly shaped pattern or by the use of a properly contoured cutting die.

In general, clothing is sold either as "ready-to-wear" or as "made-to-measure" items. In the case of ready-to-wear men's suits, for example, the suits are made in a variety of combinations of standard sizes and any alteration to fit a particular individual is made by hand at the time the suit is sold to the individual. The manufacture of such suits involves the use of a large, but limited, number of combinations of sizes and dimensions and the manufacturer can thus stock enough sets of patterns to satisfy his needs without too great difficulty. Although this procedure involves the carrying of a large number of individual patterns in stock, this is not too burdensome when it is remembered that each set of patterns can be used for cutting the pieces for many thousands of suits.

In the case of made-to-measure men's suits, the situation becomes more complicated and difficult. In the case of such suits, an individual for whom the suit is intended is first measured accurately at a number of places and the pieces for the suit then cut according to the measurements taken. This involves, first, the construction of a separate set of patterns for the particular suit involved and, subsequently, the cutting of the cloth using the set of patterns. Inasmuch as it is seldom that two individuals have the same measurements throughout, it is readily seen that the pattern made for the suit of one individual is, except in rare instances, of little or no value in the cutting of the pieces for a suit for another individual. It is thus uneconomical and impractical to retain the pattern for a made-to-measure suit in the hope that it can be used again. The making of the individual set of patterns for a made-to-measure suit thus adds considerably to the cost of the suit since it has heretofore been necessary to make the patterns entirely by hand from the measurements of the individual. Furthermore, once the pattern is prepared it has heretofore been necessary to cut the cloth to the proper shape by hand, using the pattern, since no other means has been devised for doing this. This adds further to the cost of made-to-measure suits.

The same considerations apply to the manufacture of made-to-measure clothing other than men's suits as well as to other articles prepared from sheet material which must be made according to particular dimensions in each case. It is thus apparent that any improvement in the art of cutting pieces from fabric or other sheet material in which the pieces are cut according to previously determined dimensions characteristic of the particular piece involved, or of the assembly of pieces into which the particular piece is to be incorporated, would be of considerable advantage.

According to the present invention, the foregoing and related difficulties are overcome in great measure by providing an adjustable cutting die which can be adapted to the cutting of a piece of fabric or other sheet material from a larger sheet thereof where the cut piece may be of desired regular or irregular shape and wherein the appropriate dimensions of the die can be altered as desired essentially independently of one another. Thus, in the case of men's trousers a single die can be used for cutting out the front panel of each trouser leg for a plurality of trousers of widely varying sizes and dimensions. By suitable means which will be explained, the die can be adjusted prior to use to cut the panel having a desired length of the trouser leg from the hip or crotch downwardly, a desired rise from the hip to the waistband, and desired widths at the cuff, at the knee, at the hip and at the waist, all according to the measurements taken of the individual and all essentially independently of one another when this is desirable or necessary. A separate similar adjustable die can be employed for cutting the back panel of the trouser legs.

By using the pair of dies, it thus becomes only necessary to adjust the dimensions of each as just referred to and then use the adjusted dies directly, e.g. in a suitable die press, to cut the required pieces of cloth with the certain knowledge that the pieces will be dimensioned precisely in accordance with the measurements of the individual for whom the trousers are intended. Thus, the hand operations of first making a pattern and then of cutting the cloth according to the pattern made are both avoided with a considerable lowering in the cost of the cut pieces or sections. Since both of these operations have heretofore been performed by hand, they have both been subject to certain unavoidable inaccuracies which are overcome easily using the adjustable die of the invention and a better fit of the finished garment is assured than has heretofore often been obtained.

It may be mentioned here that in many articles of clothing "right-handed" and "left-handed" pieces are involved which are dimensioned identically but in one of which one side should be the "right" side of the goods and in the other of which the other side should be the "right" side of the goods. This is the case with the two front panels, as well as with the two back panels of the legs of a pair of men's trousers. Both such right-handed and left-handed pieces can be cut at the same time by folding or otherwise arranging the goods in two superposed layers with one of the layers having its "right" side up and with the other layer having its "right" side down. Using this arrangement of the goods one cutting with the properly adjusted die will produce both the "right-" and the "left-handed" pieces with exactly the same dimensions which additionally adds to the accuracy of fit of the final garment.

Applicant is aware that adjustable dies have been proposed for cutting out shoe vamps and the like wherein the character of the article enables a die to be used in which the adjustment of the die along one dimension is related by a constant ratio to the adjustment of the die along another dimension. It is pointed out, however, that such an arrangement is utterly useless in an adjustable die to be used for cutting out pieces for articles of clothing. Thus, again in the case of men's trousers, for example, it is clear that if an adjustable die were used in cutting the front and back panels in which the length of the trouser leg from the hip downward to the cuff, or the width of the leg at the cuff or at the knee, varied in fixed proportion to the measurement around the waist, the die would have no utility whatsoever. By enabling these and other dimensions of applicant's die to be adjusted essentially independently of one another, however, applicant overcomes entirely the disadvantages of such dies as have heretofore been proposed for cutting articles where the various dimensions of the die are varied in constant proportions to one another in adjusting the die to various sizes. In addition it should be mentioned that in one modification of applicant's adjustable die the adjustments are effected by hydraulic or other suitable means from a control panel which assures a rapid and highly accurate adjustment with only a minimum of reliance upon the accuracy and skill with which the operator carries out the adjustment.

Although the invention will be described with particular reference to adjustable dies suitable for cutting panels for use in the making of men's trousers, it is pointed out that the invention is in no wise limited to an adjustable die for cutting out these particular parts of clothing. Thus, adjustable dies adapted for use in cutting out coat sleeves, the front and back panels of coats, the front and back panels of vests, coat collars for men's suits, as well as skirt panels and jacket parts for women's suits, and the like, can be made and employed in accordance with the principles of the invention.

Furthermore, although the adjustable cutting die of the invention may, when used for cutting out pieces for clothing, be of particular value in the cutting out of pieces for made-to-measure clothing, it should be mentioned that the adjustable die can be employed readily in cutting out pieces for ready-to-wear clothing and that its use for this purpose offers some advantages over current practices in the field of ready-to-wear clothing manufacture. Thus, it is entirely conceivable and practical to mount the properly adjusted die in a suitable press and to then feed a single or double layer of cloth through the press while the die is reciprocated and to thus cut a large number of pieces of cloth all of precisely the same size for use in making a correspondingly large number of articles of ready-to-wear clothing of a given size. Such procedure has the advantage over conventional procedures in the ready-to-wear industry that it avoids the labor usually involved in spreading a large number of layers of the fabric on top of one another smoothly and without wrinkles preparatory to cutting through the entire stack of fabrics with a conventional hand-manipulated cutting tool. Using the adjustable die of the invention and suitable apparatus to forward the fabric through the press, the cutting of any number of pieces of a given size from the fabric becomes almost entirely automatic.

The invention can be understood readily by reference to the accompanying drawing wherein, in the interest of clarity, certain features are shown on a somewhat exaggerated scale and wherein:

FIGURE 1 is a plan view of an adjustable cutting die, with certain parts removed, which involves features of the invention and which is adapted to be used in cutting out the front panels of legs for men's trousers;

FIGURE 2 is an elevation taken along the line II—II of FIGURE 1;

FIGURE 3 is a sectional part elevation taken along the line III—III of FIGURE 1;

FIGURE 4 is an elevation somewhat similar to the elevation of FIGURE 3 but showing an alternative arrangement of parts;

FIGURE 5 is an elevation, partially in section, taken along the line V—V of FIGURE 1;

FIGURE 6 is a part elevation taken along the line VI—VI of FIGURE 5;

FIGURE 7 is an elevation corresponding to the elevation of FIGURE 6 but showing an alternative arrangement of parts;

FIGURE 8 is an elevation, partially in section and partially cut away, taken along the line VIII—VIII of FIGURE 1;

FIGURE 9 is a plan view of a pair of adjustable cutting dies suitable for cutting out the front and back panels, respectively, of the legs for a pair of men's trousers and showing, additionally, hydraulic means involving a plurality of slave hydraulic cylinders for adjusting the dies;

FIGURE 10 is a schematic representation of master hydraulic cylinders suitable for actuating the slave cylinders of FIGURE 9;

FIGURE 11 is a schematic representation of one way in which the hydraulically operated dies of FIGURE 9 can be installed and operated in a suitable press;

FIGURE 12 is a part elevation, largely schematic, taken along the line XII—XII of FIGURE 11; and FIGURE 13 is a part elevation, partially in section, taken along the line XIII—XIII of FIGURE 9.

Referring to FIGURE 1, the adjustable die illustrated comprises a plurality of cutting knives 11, 12, 13, 14, 15 and 16. Of these, the pair of knives 12 and 13 are adapted to cut the upper or waist end of the front panel of a trouser leg and the pair 15 and 16 are adapted to cut the lower or cuff end of the panel. The side-cutting knives 11 and 14, together with adjacent sections of the knives 16 and 12 and 15 and 13, respectively, are adapted to cut the sides of the panel. In the finished trousers the edge of the panel cut by the knife 14, and the adjacent sections of the knives 13 and 15, is sewed to a back panel to form the side seam or outseam of the trouser leg. The part of the opposite edge of the panel from the hip level downward to the cuff cut by the knife 11 and the adjacent section of the knife 16 is sewed to a back panel to form the inseam of the trouser leg, the rest of the same side of the panel extending from the hip level upwardly to the waist which is cut by the knife 11 and the adjacent section of the knife 12 being sewed subsequently to smaller cut pieces to form the fly of the trousers.

It will be observed from the drawing that the cutting die of FIGURE 1 can be adjusted by increasing its width at the cuff, at the knee, at the hip or crotch and at the waist. The length of the die can be adjusted from the hip level upwardly and from the knee level downwardly. Actuation of the adjusting means, which will be referred to presently, causes the cutting knives which are assembled in overlapping relationship at their ends to slide longitudinally with respect to one another, thus increasing or decreasing the width of the panel which the adjusted die will cut at the cuff, knee, hip and waist levels and increasing or decreasing the length of the panel from the hip to the waist and from the knee to the cuff.

One manner of providing for the sliding adjustment of the cutting knives with respect to one another is illustrated in FIGURES 2 and 3 wherein longitudinal registering slots 18 and 20 are shown provided in the overlapping end sections of the knives 15 and 14, respectively. The knives are held firmly against one another in longitudinal sliding relationship by one or more retainers each conveniently comprising an internally threaded gland nut 17 which has a stem with a diameter to cause it to fit snugly in the slots 18 and 20 and which has a length a very little greater than the combined thickness of the knives 14 and 15. An externally threaded stud 19 is provided which engages the bore 22 in the nut 17 and which can be turned down tightly against the end of the stem of the nut 17. Both the parts 17 and 19 are provided with heads having a diameter sufficiently greater than the width of the slots 18 and 20 to retain the knives 14 and 15 securely between them. Thus the knives 14 and 15 can slide longitudinally with respect to one another while being held in face-to-face contact. The lower edges of both the knives 14 and 15 are beveled toward one another so as to form an essentially single, continuous cutting edge 23 which, it will be noted, extends in unbroken form entirely around the periphery of the die.

Alternatively, the overlapping section of one of the cutting knives can be bored and threaded to receive the externally threaded end of the shouldered stem of a suitable stud. The overlapping end of the other cutting knife is provided with a longitudinal slot as before and the stud is inserted through the slot and screwed into the threaded hole. By making the stem of the stud between the shoulder and the head just slightly longer than the thickness of the slotted knife, the two knives are held together in slidable, non-binding relationship. Still another alternative arrangement is illustrated in FIGURE 4 wherein the cutting knives 14 and 15 are slotted longitudinally as first mentioned and two or more sets of gland nuts 17 and studs 19 are provided and assembled with the knives between them much as illustrated in FIGURE 3. However, in this instance the facing surfaces of the knives 14 and 15 on either side of the slots 18 are cut away to provide an elongated rectangular cavity between the contacting knives in which is located a suitably dimensioned sliding element 24. The element 24 is bored at suitable intervals to receive the stems of the gland nuts 17, the element 24 thus serving to keep the nuts 17 separated from one another at predetermined distances as the knives 14 and 15 slide longitudinally with respect to one another and also providing additional means to avoid vertical movement of one of the knives with respect to the other. Any other suitable arrangement can be provided for enabling the overlapping ends of the cutting knives to slide longitudinally with respect to one another and provided any appreciable movement of one of them upwardly or downwardly with respect to the other is prevented. Means similar to those just described are employed at each region of overlap of adjacent cutting knives. Although the cutting knives 11–16 can slide easily with respect to one anotoher in the way just described to adjust the size of the die, it is advantageous that the knives be formed of relatively flexible material, e.g. of relatively thin steel, so that they will flex somewhat under the action of the adjusting means to promote sliding of their overlapping portions in instances where the adjustment may be inclined to cause a certain amount of binding of the overlapping ends of the knives against one another. Adequate lubrication of the sliding surfaces is also of advantage.

It is common practice in the cutting out of panels for certain articles of clothing to cut one or more small notches in the edges of the panels as a guide for locating the panel with respect to another panel to which it is to be sewed. In cutting the front panel of a trouser leg, for example, it is customary to notch the panel on each side at the knee level and along the outseam at the hip level. Such locataions are indicated by the reference numerals 25, 26 and 27, respectively, in FIGURE 1. These notches, as well as other suitably located notches which may be desired, such as an outlet notch 28, can be formed in the panel when it is cut using the die of this invention by contouring the cutting edges of the proper cutting knives in appropriate fashion. Thus, in the case of the cutting knife 14 of FIGURE 1 it will be noted that the cutting edge of the knife lies at the bottom of its outer side, the bottom of the knife being sloped upwardly and inwardly of the die. It is a simple matter at the points represented by the numerals 26 and 27 to grind the lower edge of the knife 14 so that the cutting edge extends angularly from the outer side to the inner side of the knife and then back again to the outer side, as represented more clearly in FIGURE 7 which is a view of the knife 14 looking upward from below it along the region indicated by the numeral 26.

In the case of the notches to be cut at the locations 25 and 28 of FIGURE 1, it will be noted that in this particular instance the cutting knife 11 has its cutting edge located along its inner side. In this instance, as shown in FIGURES 5 and 6, it convenient to weld or otherwise secure a small notch block 31 to the iner surface of the knife 11 with the lower surface of the block even with the cutting edge of the knife 11. By properly grinding the lower surfaces of the knife 11 and of the block 31, a notch-cutting section of the cutting edge is provided in the lower surface of the block as shown in FIGURE 6 which is a view looking upward at the bottom of the knife 11 and block 31 along the region indicated by the numeral 25. A similar block can be provided to provide for the notch indicated by the numeral 28.

Any suitable means can be provided for adjusting the width and length of the cutting die which has just been described provided it is adapted to adjust the separate dimensions of the die independently of one another when necessary. The adjusting means can be adapted to be operated directly by hand, as is illustrated and as will be described in connection with FIGURE 1, or by hydraulic means, as will be described later in connection with FIGURE 9, or by suitable electrical means or in any other fashion. Regardless of the precise adjusting means employed, the invention contemplates, in connection with the adjusting means, the provision of a rigid adjustment base member located roughly centrally of the die area defined by the cutting knives, the adjusting means being mounted rigidly on the adjustment base member and being connected to the cutting knives only by adjusting arms the ends of which are secured pivotally to the knives. The adjustment base member and the several adjusting means thus comprise a single rigid adjustment structure, subject only to elongation in certain instances which will be described, which may be said to "float" internally of the die area. Suitable locking means are, of course, provided for each adjusting mechanism to hold the mechanism firmly in the desired adjusted position.

With the foregoing features in mind and referring again to FIGURE 1, it will be noted that internally of the die area defined by the cutting knives 11–16, inclusive, there is located an elongated rigid adjustment base member 32, suitably a rectangular bar, to which are attached rigidly, often as an integral part thereof, four short laterally-extending bars 33, 34, 35 and 36 arranged in pairs opposite one another. These side extension of the base are located at the knee and hip levels of the panel which is to be cut using the die and serve as mountings for the mechanisms for adjusting the widths of the die at these levels. The rigid bar 32 extends in either direction for a suitable distance beyond the respective laterally-extending bars, these end extensions furnishing suitable mountings for the adjusting mechanisms to effect adjustment in the length of the die. The mechanisms for adjusting the widths of the die at the waist and cuff move longitudinally with respect to the base member 32 in response to the lengthening or shortening of the die.

The adjusting mechanisms illustrated in FIGURE 1 comprise rack and pinion arrangements. The lateral extensions 33, 34, 35 and 36 and the end sections of the bar 32 extending beyond the lateral extensions are milled on one side, e.g. on their upper sides, to reduce their thicknesses somewhat. In the final assemblage these areas of reduced thickness of the adjustment base are provided with cover plates 37, 38, 39 and 42, which will be referred to later, the plates being secured in place as by studs or screws 43. Thus the cover plate 37 extends from the outer end of the lateral extension 33 across the bar 32 to the outer end of the lateral extension 34, and is secured in place by means of suitable studs or screws 43. Similarly, the cover plate 38 is secured to the lateral extensions 35 and 36 of the bar 32 at the hip level; the cover plate 42 is secured to the extension of the bar 32 extending upward of the die beyond the cover plate 38; and the cover plate 39 is secured to the section of the bar 32 extending downwardly beyond the cover plate 37.

As shown more particularly in FIGURE 8, a pair of raceways 44 and 45 to accommodate a pair of racks 46 and 47, respectively, are formed which extend longitudinally of the later extensions 33 and 34 and across the bar 32 immediately beneath the cover plate 37. The cover plate 37 is drilled centrally and a registering hole 48 is drilled through the bar 32 to accommodate a pinion shaft 49 having threaded ends on which is formed a pinion gear 52 which engages the teeth of both of the racks 46 and 47. Rotation of the pinion shaft 49 thus causes the racks 46 and 47 to travel in opposite directions in their respective raceways, the racks being retained in their raceways by the cover plate 37. One of the racks 47 protrudes beyond the end of the rigid extension 33 and is suitably split at its outer end, as illustrated more particularly in FIGURE 5, and drilled vertically through the split section to accommodate a pin 53 which engages pivotally a suitably drilled horizontal flange 54 secured to the inner surface of the cutting knife 11. One convenient means for securing the flange 54 to the knife 11 comprises forming the flange integral with a vertically extending flange plate 55 which is in turn secured to the knife 11 as by countersunk screws 56. However, the flange 54 can be secured to the cutting knife 11 in any convenient fashion. The rack 46 projects beyond the lateral extension 34 and is formed and secured to the cutting knife 14 in an entirely analogous fashion.

The pinion shaft 49 is provided with a keyed or pinned nut 57 at its lower end which bears on the lower surface of the bar 32 and at its upper end with a second or locking nut 58. The extreme upper end 50 of the pinion shaft 49 is squared to accommodate a wrench or handle (not shown). Upon loosening the nut 58 the shaft 49 and pinion 52 can be rotated to the desired extent to cause the cutting knives 11 and 13 to be displaced farther from one another or to be drawn closer to one another, after which they can be locked in their adjusted position by tightening the nut 58 firmly down onto the cover plate 37. Any other suitable means can be employed for locking the pinion 52 after the adjustment has been made. It will be apparent from the foregoing that the adjustment of the width of the die at the knee level as effected by rotating the pinion 52 results in the oppositely located knives 11 and 14 being at all times moved toward or away from the bar 32 for the same distance and that the width of the die at the knee level can be adjusted entirely independently of any of the other adjustments.

The adjustment of the width of the die at the hip level, i.e. at the level of the lateral extensions 35 and 36, in cases where the trousers are to be made without pleats, can be effected in a manner entirely analogous to that of the adjustment at the knee level except that in this instance, and as illustrated at the right hand side of FIGURE 8, provision is made for moving the cutting knife 14 with respect to the rigid bar 32 by a distance somewhat greater than, e.g. usually about 1.5 times as far as, the distance which the knife 11 is moved away from or toward the bar 32. This effect as accomplished by locating the racks 59 and 62 in raceways at different levels beneath the cover plate 38 so that they engage separate pinions 63 and 64 of different diameters on the pinion shaft 65. Thus, by constructing the pinion 64 which engages the teeth of the rack 59 with a diameter 1.5 times the diameter of the pinion 63 which engages the teeth of the rack 62, the rack 59 will be caused to travel 1.5 times as far in either direction as the travel of the rack 62. It should be mentioned that the ratio of 1.5 relating the distance traveled by the rack 59 to the distance traveled by the rack 62 is a value which is observed conventionally in the cutting of the front panels of trouser legs of different sizes, exclusive of any allowance for pleats, to insure a proper fit of the trousers and that the value 1.5 for this ratio is, therefore, that which is conventionally observed by most cutters. Should it be desired that this ratio be slightly different from 1.5, it is, of course, apparent that the racks and pinions can be constructed to give any desired ratio. In the event the front panel is to be cut to provide for pleated trousers, the width at the hip level must be increased by a still further amount which is constant regardless of the size of the trousers being made and regardless of whether the trousers are to be 2-pleated or 4-pleated. In this event, entirely separate pinions are provided for operating the racks 59 and 62 in a manner entirely analogous to that illustrated for operating the racks 76 and 77 which will be described presently.

To provide for lengthening the die downwardly from the knee level, the lower end of the bar 32 is fitted with a single rack and pinion which is otherwise similar to the double rack arrangement at the knee level which has been described. In this instance the rack 66 terminates at its lower end in a plate 67 which is secured, e.g. bolted, to a lower, or cuff, rack block 68 which is similar in all principal respects to the block formed at the knee level of the die by the lateral extensions 33 and 34 but which is in this instance shown without a cover plate to illustrate the arrangement of the racks in their raceways and the actuating pinion. It will be seen that by rotating the pinion 69, in this instance the cutting knives 15 and 16 will be moved away from or toward one another by the same distances. To provide for lengthening the die at its upper or waist end, a single rack 72 and pinion is provided similar to that provided at the lower end of the bar 32, the outer end of the rack 72 being connected by way of a plate 73, in a manner entirely analogous to the plate 67 at the lower end of the die, to an upper, or waist, rack block 74 which is in this instance shown covered by a cover plate 75.

In adjusting the width of the die at the waist, it is essential for a proper fit of the trousers for the rack 77 to travel further than the rack 76. In the event the panel being cut is for non-pleated trousers, the differential travel of the two racks involves a constant ratio and pinions of different diameters on the same shaft can be employed to engage the two racks in a manner entirely similar to that shown in FIGURE 8 for the pinions 63 and 64 and the racks 62 and 59. However, in FIGURE 1 the widening mechanism at the waist is illustrated as involving separate pinions 78 and 79 for driving the racks 76 and 77, respectively, whereby they may be driven entirely independently of one another, the die thus being adapted for adjustment to cut front panels for non-pleated, for 2-pleated or for 4-pleated trousers as desired. It may be pointed out that in the case of 2-pleated trousers, wherein each front panel is cut to provide sufficient goods to form one pleat, the extra goods required at the waist is the same regardless of the size of the trousers being made. When each front panel must include sufficient goods for two pleats, i.e. for 4-pleat trousers, the panel must be still wider, but by a still constant amount regardless of the size of the trousers being made.

In adjusting the die of FIGURE 1 the several pinion shafts are unlocked by loosening the locking nuts and then adjusted one after the other and locked again. It convenient to first effect the desired travel of the racks 66 and 72 to effect the proper adjustment in length of the die, after which these racks are locked in their adjusted positions. The width of the die at the cuff is preferably next adjusted by rotating the pinion 69 and locking it, followed by the adjustment at the knee, then at the hip and finally at the waist, each adjusting mechanism being locked in its adjusted position as soon as the adjustment is completed. To provide for accurate adjustment of the die along its several dimensions, the parts of the racks which protrude from the rack raceways are marked with a scale, such as scale 82 on the rack 46, and a pointer 83 is secured to the rack block in a position such that the scale travels past the end of the pointer whereby the exact position of the rack can be read off easily. It is clear that where there are two racks operated by the same pinion, or by different pinions secured to the same shaft, as in the case of the racks 46 and 47, only a single scale and pointer need be provided. The locations of the several pointers required for the adjustment of the die of FIGURE 1 are illustrated in FIGURE 1 but need not be referred to individually. By constructing the scales on the several racks in suitable fashion and by marking them accordingly, it is possible to adjust the die according to the actual measurements taken of an individual without any calculation or transposition of one set of digits to another.

In FIGURE 9 there is illustrated a pair of adjustable dies for cutting the front and back panels, respectively, of trouser legs, but in this instance the invention is illustrated as employing hydraulic means for effecting the adjustment of the dies. There is also shown in this and subsequent figures means for actuating the hydraulic adjustment mechanisms illustrating certain ways in which the utilization of hydraulic mechanisms and controls offers certain advantages over the strictly manual adjustments of the die of FIGURE 1.

The hydraulic adjusting and control mechanisms illustrated in FIGURE 9, and in certain subsequent figures, involve utilization of a plurality of master and slave hydraulic cylinders having conduit connections between each master and slave combination to effect extension and retraction of the piston rod of the slave cylinder. To simplify the use of reference numerals, each slave hydraulic cylinder will be referred to by a reference numeral followed by the letter "S" and the corresponding master cylinder will be referred to by the same reference numeral except that it will be followed by the letter "M." The piston rod of the slave cylinder will be referred to by the same numeral as the slave cylinder except that it will be followed by the letter "P." Furthermore, the conduit between each pair of master and slave cylinders through which hydraulic fluid is forced to effect extension of the piston rod of the slave cylinder will be referred to by the same reference numeral as the slave cylinder itself except that the numeral will be followed by the letter "E." The conduit through which fluid is forced from the master cylinder to the slave cylinder to effect retraction of the piston rod of the slave cylinder will be referred to by the same reference numeral as the slave cylinder except that it will be followed by the letter "R." Thus, as an example, the numeral 101M refers to a master cylinder, and the numeral 101S refers to the slave cylinder controlled by the master cylinder 101M. The forcing of fluid from the master cylinder 101M to the slave cylinder 101S through the conduit 101E effects extension of the piston rod 101P of the slave cylinder and the forcing of fluid from the master cylinder to the slave cylinder through the conduit 101R effects retraction of the piston rod of the slave cylinder.

In FIGURE 9 the die for cutting the front panels of trouser legs comprises the same cutting knives 11–16, inclusive, and the same provisions for notching the goods as at 25, 26, 27 and 28 as illustrated and described in connection with FIGURE 1. The die for cutting the back panel of a trouser leg comprises the cutting knives 84, 85, 86, 87, 88 and 89 which correspond in general to the knives of the die for the front panel except that the contours of the knives are somewhat different to adapt them particularly to the cutting of back panels rather than front panels. In both the dies of FIGURE 9 the ends of the adjacent cutting knives overlap and slide longitudinally with respect to one another during adjustment of the die, all as noted in the description of FIGURES 1, 3 and 4. Provision for cutting notches in the edges of the back panel, as at 93, 94 and 95, to be in register with the notches 26, 25 and 27, respectively, of the front panel when the two panels are to be sewed together, is made in essentially the same manner as in the case of the die for cutting the front panel. Other conventional outlet notches, such as the notches 80, 81 and 96, can also be provided for, if desired. It will, of course, be seen that the side of the back panel cut by the knife 84 and the adjacent parts of the knives 85 and 89 will in the finished pair of trousers be sewed to the front panel to form the outseam or side seam of the trouser leg, whereas the side of the back panel cut by the knives 87 and 88 between the region of the notch 96 and the cuff end of the panel will be sewed to the front panel to form the inseam of the trouser leg extending from the crotch to the cuff. The portion of the side of the back panel cut by the knives 87 and 86 from the region of the notch 96 to the waist end of the panel will be sewed to the same portion of another back panel to form the back seam of the trousers extending from the waist to the crotch.

It will also be noted that the die for cutting the back panel is also provided with a pair of notch-cutting configurations 97 and 98 which lie on either side of the notch 96. Because of the variation in the width of goods from which trousers are ordinarily cut, it is common practice to insert a triangular piece of goods between the front panel and the back panel of each trouser leg just beneath the crotch. This avoids the necessity of using goods of sufficient width to form the full width of the back panel of the truser leg at hip height and the resultant waste of goods which would occur if this were done and the parts of the goods both above and below this region were trimmed off and discarded. Furthermore, it is also common practice to cut the triangular pieces which are to be inset all of the same size regardless of the size of the pair of trousers which is being made, and for this reason its is common practice to trim the inseam side of the back panel by cutting off some of the goods at the hip level so that the triangular inset can be inserted without it itself having to be trimmed. To provide for this eventuality, the cutting knife 87 is adapted as at 97 and 98 to cut upper and lower trim notches as defining the part of the back panel cut by the die which can be trimmed off, i.e. along the dotted line 99, to accomplish the foregoing purpose. In using the die, it is thus only essential that the goods extend beneath the knife 87 as far toward the adjacent edge of the die as the line 99 since any part of the back panel formed which extends beyond this line will be cut off anyway.

Referring again to the die for cutting the front panel as illustrated in FIGURE 9, it will be noted that as in FIGURE 1 there is provided a rigid adjustment base including an elongated member 139, corresponding roughly to the member 32 of FIGURE 1, which is positioned internally of the outline formed by the cutting knives and which is unattached to any of the cutting knives 11–16, inclusive, except by the hydraulic adjusting means which will be described. A pair of slave hydraulic cylinders 115S and 116S fitted with end mounting plates at their ends opposite the piston rods are mounted securely, as by bolts 142 and 143, opposite one another of the sides of the member 139 at the knee level of the front trouser leg panel which is to be cut using the die. The outer end of the piston rod 115P is provided with a split head 144 which is secured pivotally by a pin 53 to a flange, the flange in turn being secured to a flange plate 55 which is bolted or screwed to the cutting knife 11 as in the case of the flange and flange plate 54 and 55 of FIGURE 1. Extension of the piston rod 115P from the cylinder 115S will, therefore, serve to move the knife 11 away from the rigid member 139 at the knee level of the die. In similar manner the piston rod 116P of the opposite cylinder 116S is attached to the cutting knife 14 so that forcing similar amounts of hydraulic fluid into the cylinders 115S and 116S by way of the conduits 115E and 116E, respectively, will spread the die equally on both sides of the rigid member 139 at knee level.

Entirely similar opposite cylinders 102S and 101S are secured to the rigid member 139 at the hip level of the die and their respective piston rods 102P and 101P are secured pivotally to the knives 11 and 14 as in the case of the piston rods 115P and 116P. In this instance, as pointed out in the description of FIGURE 1, the piston rod 101P must ravel a greater distance than does the piston rod 102P. The means for accomplishing this will be described later.

To provide for lengthening of the front panel die at the cuff end, a slave hydraulic cylinder 110S fitted with plate end mount opposite the piston rod 110P is secured, as by bolts or screws 147, on the squared end of the rigid member 139. The piston rod 110P, which is thus adapted to move longitudinally of the die, is secured to a lower mounting block 149. Slave hydraulic cylinders 111S and 112S are secured rigidly to the block 149 and arranged so that their respective piston rods 111P and 112P travel laterally with respect to the die, being secured at their outer ends pivotally to the cutting knives 16 and 15, respectively. Extension of the piston rods 111P and 112P thus serves to widen the die at the cuff and extension of the piston rod 110P serves to lengthen the die at the cuff end, retractions of these piston rods effecting the reverse operation.

Lengthening of the die at its upper waist end is effected using a slave hydraulic cylinder 119S, mounted on the upper end of the rigid member 139 in a manner entirely similar to the mounting of the cylinder 110S on its lower end. The outer end of the piston rod 119P is secured to an upper mounting block 145 and slave hydraulic cylinders 105S and 106S are mounted on the block 145 and arranged to effect increase or decrease of the width of the die at the waist in a manner entirely analogous to the action of the cylinders 111S and 112S at the cuff end of the die. As a matter of convenience, if desirable or necessary, the cylinders 105S and 106S can be secured to the block 145 in the way illustrated with their respective piston rods 105P and 106P traveling through suitable holes bored in the block 145. This arrangement may sometimes be advisable, depending upon the length of the slave cylinders employed, since it provides for a greater throw or travel of the cutting knives 12 and 13 than might otherwise be the case if each of the cylinders were mounted on the side of the block 145 nearest the cutting knife which it is intended to actuate. It will thus be seen that an extension of the piston rod 119P serves to lengthen the die between the hip and waist levels and that the extensions of the piston rods 105P and 106P serves to widen the die at its waist level, the reverse being true with respect to retractions of the pistons 119P, 105P and 106P.

It is to be noted, also, that, as mentioned previously, it is generally necessary in making any adjustment of the width of the die at the waist level to cause the piston rod 106P to travel further than the piston rod 105P. One way of effecting this will be described later. It will be noted, however, that by proper actuation of the several hydraulic cylinders secured to the rigid member 139 the width of the die at the cuff, at the knee, at the hip and at the waist, as well as its length at the cuff end and its length at the waist end can each be adjusted independently of one another. As will be shown later, these adjustments may each be made easily and in precise agreement with the measurements of any particular individual.

The die for the back panel of a trouser leg illustrated in FIGURE 9 is constructed and adjusted for size hydraulically in essentially the same manner as the adjustment just described in detail for the die for cutting the front panel of a trouser leg. Here again a rigid adjustment base including the member 146 is provided which corresponds in function and in location with respect to the cutting knives 84–89, inclusive, to the function and location of the rigid member 139 of the front panel die with respect to the cutting knives 11–16, inclusive. The rigid member 146 has secured to its slave hydraulic cylinders 117S and 118S at the knee level of the die and slave cylinders 103S and 104S at the hip level of the die. Slave cylinder 109S mounted on the squared lower end of the rigid member 146 effects the lengthening or shortening of the die at its cuff end and slave cylinders 113S and 114S mounted on the block 148 effect an increase or decrease in the width of the die at the cuff. A slave cylinder 120S mounted on the upper end of the rigid member 146 serves to lengthen or shorten the die at its waist end and slave cylinders 107S and 108S mounted on the block 152 serve to increase or decrease the width of the die at its waist end. Means for effecting differential travel of the piston rods 107P and 108P will be described later.

It will be noted that in this instance the upper end of the rigid member 146 is formed angularly with respect to the longitudinal axis of the member so that the path of travel of the piston rod 120P diverges by a corresponding angular amount from an extension of the longitudinal axis of the rigid member 146. This angular extension is such that the path of travel of the piston rod 120P is essentially normal to the cutting edge of the waist end of the die formed by the cutting knives 85 and 86. This provides for somewhat better control of the cutting knives 85 and 86, during their travel when the die is adjusted. The angle by which the travel path of the piston rod 120P diverges from an extension of the longitudinal axis of the rigid member 146 is generally between about 8° and about 15°, preferably about 11°, and the direction of divergence is toward the outseam side of the die. However, this angle of divergence is susceptible of considerable variation although in the majority of instances it will generally fall within the limits just given.

In the case of the die for cutting the back panel for a trouser leg as just described briefly, it will be noted that here again the several dimensions of the die can be adjusted independently of one another and that the rigid member 146 and the adjusting slave cylinders mounted thereon constitute a rigid assemblage which "floats" within the die area and which is entirely separate from and unattached to the several cutting knives except by the pivotally attached piston rods which effect the adjustments of the die.

In the formation of the back panels of men's trousers, it is usually necessary to secure a proper fit of the trousers at the waistline to cut out a small triangular-shaped piece of the goods, or dart, a short distance from the outseam to effect a construction of the trousers at the waist. This triangular piece is essentially in the nature of a right triangle with the shorter leg coinciding with the upper, or waist, edge of the panel and with its longer leg, which is usually from about one to about three inches long, projecting downwardly essentially perpendicularly from the upper end of the panel. The hypotenuse of the right triangular space left by cutting out this piece of goods faces the edge of the panel which is to be sewed to form the outseam of the trousers.

Provision can be made for modifying the back panel die of FIGURE 9 to cut out this triangular piece of goods at the same time the panel is cut, thus avoiding the extra operation of cutting out the triangular piece by hand. Although this can be effected in a number of ways, one way illustrated in FIGURES 9 and 13 contemplates the provision of a suitable dart-cutting die 153 with suitable divergent knife sections being arranged and located so that divergent ends or feet 155 of the knife section lie in contact with and are adapted to slide along the inner surface of the cutting knife 85. The die piece itself is split at its end opposite the feet 155 and is arranged to be clamped, as by a bolt 154, securely to the slave hydraulic cylinder 107S. Suitable registering holes 156 are bored in the divergent knives of the dart die to accommodate the travel of the piston rod 108P through them. It will thus be noted that the dart die 153 remains stationary and fixed with respect to the cylinder 107S and the mounting block 152. By this arrangement the dart cut by the die 153 is spaced from the outseam in the finished trouser leg by the correct amount regardless of the size of the trousers.

As mentioned previously, there is provided for each of the slave hydraulic cylinders 101S–120S, inclusive, a master hydraulic cylinder 101M–120M, inclusive, each master and slave being connected by conduits so that travel of the piston in the master cylinder causes a precisely predetermined amount of travel of the piston rod of the slave cylinder. Furthermore, it is convenient to cut the front and back panels of the same pair of trousers at the same time using a pair of dies as illustrated in FIGURE 9 adapted to cut these two panels. When this is done it becomes possible to assemble master cylinders for the slave cylinders of both dies into several groups of which the piston rods for the master cylinders of each group can be operated as a unit.

As an example, when cutting the front and back panels for the same pair of trousers, it is desirable that any increase in size at the cuff be accomplished by increasing the width of both the front and back panels by the same amount and, furthermore, that the increase of width in each panel be effected equally from the center toward the inseam and outseam sides of the panel. It thus becomes possible when the slave cylinders 111S, 112S, 113S and 114S are of the same internal diameter to provide the corresponding master cylinders each also with the same internal diameter and to then connect the piston rods of the four master cylinders to a single actuating mechanism, e.g. to a single handle, so that they travel as a unit. For a given throw of the handle the same amount of fluid will be forced from each of the four master cylinders into the corresponding slave cylinder and the travel of the slave cylinder piston rods 111P, 112P, 113P and 114P will be precisely the same. Such an arrangement of the master cylinders is shown schematically in FIGURE 10 wherein it will be noted that the piston rods of the four master cylinders 111M, 112M, 113M and 114M, represented by the lines identified by the numerals 157, 158, 159 and 160, respectively, are each connected to a single piston rod connecting bar, represented by the line 161, and that this bar is actuated by a single handle represented by the line 132.

Further reference to FIGURE 10 will show that the master cylinders 109M and 110M which control the lengths of the two dies from the knee level to the cuff can be operated together by way of a single handle 131 and that the two master cylinders 119M and 120M which control the lengths of the two dies from the hip level to the waist can be operated together by way of the single handle 136. In the same fashion the four master cylinders 115M, 116M, 117M and 118M which regulate the widths of the dies at the knee level can also be operated together by way of a single handle 133.

In the case of the four master cylinders 101M, 102M, 103M and 104M the same arrangement can be made to operate them by way of a single handle 134, if necessary modifications are incorporated to insure that while the piston rods 103P and 104P are each traveling the same distance the piston rod 101P travels a greater distance and the piston rod 102P travels a lesser distance than either of the rods 103P or 104P and provided, further, that the sum of the distances traveled by the rods 103P and 102P is equal to the sum of the distances traveled by the rods 103P and 104P, the ratios of distances traveled by the four separate piston rods 101P, 102P, 103P and 104P with respect to one another remaining constant regardless of the actual distance traveled by any one of them. This effect is accomplished by employing master cylinders 103M and 104M which have the same internal diameter but employing a master cylinder 101M which has a greater diameter and a master cylinder 102M which has a lesser diameter than either of the cylinders 103M or 104M and, further, by selecting these four master cylinders with internal diameters such that the sum of the cross sectional areas of the master cylinders 101M and 102M will be the same as the sum of the cross sectional areas of the master cylinders 103M and 104M. Thus, when the handle 134 is thrown to cause the four master cylinder piston rods to each travel the same distance, the slave cylinder piston rods 103P and 104P will each travel the same predetermined distance, the piston rod 102P will travel a lesser distance and the piston rod 101P will travel a greater distance than the predetermined distances, and the sum of the distances traveled by the rods 101P and 102P will equal the sum of the distances traveled by the rods 103P and 104P, these ratios of travel being maintained regardless of the actual distances traveled by each. It is generally advisable to choose master cylinders 101M, 102M, 103M and 104M not only such that the foregoing ratios will be maintained but, also, such that the distance traveled by the piston rod 101P will be approximately 1.5 times the distance traveled by the piston rod 102P, it being, of course, understood that in the foregoing discussion the slave cylinders 101S, 102S, 103S and 104S are all assumed to have the same internal diameters. However, the diameters of the slave cylinders 101S–104S and of the master cylinders 101M–104M can be related in any suitable way provided the foregoing ratios of the travels of the piston rods 101P–104P are maintained.

In somewhat similar fashion, the piston rods of the four master cylinders 105M, 106M, 107M and 108M can be connected together and actuated by the single handle 135. In this instance because, as noted previously, the slave cylinder piston rods 105P and 107P should each travel further by a constant ratio than the piston rods 106P and 108P while the two latter rods each travel the same distance, the desired effect is accomplished when the slave cylinders 105S, 106S, 107S and 108S each have the same internal diameter, by utilizing master cylinders 106M and 108M having the same internal diameter and utilizing master cylinders 105M and 107M also having the same internal diameter greater by the required degree than the internal diameter of cylinders 106M and 108M.

It will be noted that in FIGURE 10 two additional master cylinders 121 and 124 are included. The cylinder 121 is connected by way of fluid conduits 122 and 123 to the conduits 101E and 101R, respectively, which latter conduits serve to convey fluid between the slave cylinder 101S and the master cylinder 101M. In similar fashion, the cylinder 124 is connected by fluid conduits 125 and 126 with the conduits 105E and 105R, respectively, which serve to convey fluid between the slave cylinder 105S and the master cylinder 105M. The piston rods of the cylinders 121 and 124 are actuated by the handles 137 and 138, respectively. These two cylinders 121 and 124 are utilized when the dies are to be adjusted to cut front panels of trousers which are to contain one or two pleats on each side of the front, i.e. for 2-pleat or 4-pleat trousers. When each front panel is to be cut to provide for a single pleat, the handles 137 and 138 are thrown a predetermined distance to force a predetermined amount of fluid from each of the cylinders 121 and 124 into the conduits 101E and 105E, respectively. These amounts of fluid are in addition to the amounts forced into the same conduits from the master cylinders 101M and 105M, respectively, and, therefore, cause an additional amount of extension of the slave cylinder piston rods 101S and 105S, usually about 1¼ inches and about 2 inches, respectively, over that caused by the operation of the cylinders 101M and 105M alone. These additional extensions of the piston rods 101P and 105P provide for enlargement of the front panel cut by the die by an amount sufficient to provide for a single pleat in each front panel. It will be noted that this extra amount of goods utilized for forming the pleat is the same regardless of the size of the trousers for which the die is otherwise adjusted.

When it is desired to provide a front panel in which two pleats are to be made, the handle 138 is thrown an additional distance to force an additional amount of fluid from the cylinder 124 into the conduit 105E which results in still further extension, usually about an additional 1 inch, of the distance of travel of the piston rod 105P. This widens the die still further at the waist end and provides sufficient goods to cut the panel for forming two pleats. It is noted that the second pleat of the pair is always shorter than the first pleat and does not extend as far down as the hip line. Therefore, in providing goods in the panel for the second pleat it is unnecessary to extend the piston rod 101P further than for a single pleat.

It has been mentioned previously that the dies of the invention can be used for cutting sheet material by employing them in connection with a suitable press. In the case of the manually adjustable die of FIGURE 1, it is convenient to place the goods in folded position on the platen of the press and to then set the adjusted die on the goods with the cutting knives in contact with the goods. The press is then closed to force the cutting knives through the goods, care being taken to avoid injuring the cutting edges of the die by too great pressure on the press platen. The same procedure of first adjusting the dies and then setting them on the goods in the press can be employed with hydraulically adjustable dies of FIGURE 9, if desired, the various extension and retraction conduits being let out from inside the die area through suitable holes in the cutting knives to a suitable control box or cabinet in which the various master cylinders and the cylinders 121 and 124 are located. The press is then closed as before and then opened and the dies and cut panels removed.

In FIGURE 11 there is illustrated schematically one arrangement especially well adapted to use when the cutting dies are adjusted hydraulically. In this arrangement a length of cloth 162 is shown located on a press platen 163 below a raised press plate 164. One or more dies of the invention, such as the pair of dies for cutting front and back panels for a pair of trousers as shown in FIGURE 9, is suspended closely beneath the press plate 164, one of the dies being represented schematically at 165. Suspension of a die, such as the die for cutting the front panel, in this position can be effected readily by means of bolts 167 passing through suitable holes in the press plate 164 and engaging internally threaded bolt holes, 166 of FIGURE 9, in the base member 139. By providing the bolts 167 with suitable nuts 168 which bear on the upper surface of the press plate 164 and by screwing the nuts down on the bolts to the required degree, the upper edges of the cutting knives of the die 165 can be brought into light contact with the lower surface of the press plate 164. Care should, of course, be exercised to avoid turning the nuts 168 down so tightly that the cutting knives bind on the lower surface of the press plate and interfere with their travel during adjustment of the die.

In this modification the master cylinders 101M–120M and the cylinders 121 and 124 are located in a suitable housing 169 mounted on the upper surface of the press plate 164, as by brackets 172. The several extension and retraction conduits extending between the master and slave hydraulic cylinders are brought upward from the die through suitable ports 173 in the press plate 164 into the housing 169. The die 165, the press plate 164, the housing 169, the master cylinders 101M–120M and the cylinders 121 and 124 together with the connecting conduits for hydraulic fluid thus all reciprocate vertically as the press is opened and closed.

Reference to FIGURE 12 will illustrate schematically one way in which the master cylinders 101M—120M and the cylinders 121 and 124 can be located within the housing 169 and one way in which they can be actuated by the several handles referred to previously. In this modification, using the master cylinder 111M and associated parts by way of illustration, all of the master cylinders are mounted by means of a suitable fitting at their ends opposite their piston rods to swivel on a horizontal cylinder pivot rod 174, the rod being supported in a fixed position in suitable manner. The several handles 131–138, are also mounted on a handle pivot rod 175 which extends horizontally within the housing 169 and is supported in suitable manner. The rods 174 and 175 can extend between and be supported by the ends of the housing 169 if desired, or they can be supported in their horizontal position in any other suitable manner. The piston rod 157 of the master cylinder 111M is fitted at its free end with a pivot connection so as to engage pivotally the piston rod connecting bar 161 previously referred in connection with FIGURE 10. The bar 161 is also engaged in similar manner by each of the master cylinder piston rods 158, 159 and 160 designed to be operated, along with the rod 157, by the single handle 132. The rod 161 is provided with a lug 176 near the center of its upper side which is bored to receive the rod of the handle 132, the lug and rod being secured together as by a pin 177. Thus, as the handle 132 is rotated upwardly or downwardly around the swivel rod 175, the piston rod 157 and the piston attached to it will be caused to travel longitudinally inside the master cylinder 111M and fluid will be forced from the master cylinder to the slave cylinder 111S through the conduit 111E or through the conduit 111R, depending upon the direction of throw of the handle 132. At the same time hydraulic fluid from each of the master cylinders 112M, 113M and 114M will also be forced into the respective slave hydraulic cylinders by the single throw of the handle 132.

The handle 132, and in similar fashion the other handles referred to, project through suitable vertical slots 171 in the curved front of the housing 169 so that they can be grasped and operated by hand. Suitable scales 170 are provided alongside the slots so that the operator can determine accurately the degree of throw of the individual handles. It is also desired that one side of each of the slots through which the handles project be formed with suitable notches 178 into which the corresponding handles are pressed by suitable spring means, not shown, to lock the handle in position when the desired degree of adjustment has been effected.

In using a die mounted beneath a press plate in the manner just described, it is only necessary for the operator, with the press plate raised, to spread the desired piece of double-over fabric on the platen of the press and to then adjust the die according to the measurements furnished by moving the several handles into the appropriate notches. The die is then closed, after which it is opened and the four properly cut panels of fabric removed. In a modification not illustrated in detail the same arrangement as shown in FIGURE 11 can be employed and additional mechanism can be supplied to draw the length of goods across the platen for the required distance after each opening of the press to place an additional length of fabric in position to be cut. Using this arrangement and synchronizing the travel of the goods with the opening and closing of the press, it is entirely feasible to employ the die of this invention for the continuous and automatic cutting of pieces of desired contour one after the other. The die thus becomes of value in the cutting of pieces for use in making ready-to-wear clothing where large numbers of pieces of identical shape and dimensions are to be cut.

Mention should be made of the fact that when more than one die, such as the pair illustrated in FIGURE 9, is employed in a press at the same time it is desirable in the interest of economy of stock material from which pieces are being cut that the adjacent sides of the dies be located as close to one another as possible. To provide for this condition and for the possibility of adjusting the dimensions of both of the dies, it is entirely feasible, although no shown in the drawing, to tie the adjacent sides of the two dies together, e.g. with loosely fitting bolts extending between them, so that the distance between them can be maintained at any desired small value during adjustment but so that the movements of the cutting knives of the two dies will not be interfered with during adjustment. One of the dies can be secured to the press plate with bolts as described in connection with FIGURE 11 and the bolts for supporting the other die can pass through suitably located elongated slots, rather than through round holes in the press plate to allow the entire second die to move laterally to accommodate the adjustment of the first die. In this way a maximum utilization of the goods is effected.

I claim:

1. In an adjustable die for cutting irregularly shaped pieces from sheet material, the combination including: a plurality of suitably shaped cutting knives located in sliding, overlapping end relationship with one another to provide an essentially continuous cutting edge encircling a die area of predetermined configuration; a rigid adjustment base member; a plurality of adjusting elements secured rigidly to the base member each having an extensible and retractable adjusting arm, the assemblage of base member and adjusting elements being located entirely within the encircled die area and being connected to the cutting knives pivotally at the ends of the adjusting arms removed from the base member; and means to extend and retract the adjusting arms to cause sliding movement with respect to one another of the overlapping end sections of the cutting knives whereby adjustments of the dimensions of the encircled die area are effected essentially independently of one another.

2. Apparatus as claimed in claim 1 wherein each cutting knife is adapted to flex during adjustment of the die sufficiently to maintain the overlapping end sections in nonbinding, sliding alignment.

3. Apparatus as claimed in claim 1 wherein each adjusting arm comprises a rack and each means to extend and retract the adjusting arms comprises a pinion gear engaging at least one of the respective racks, each pinion gear being adapted to be rotated independenly of the other pinion gears.

4. Apparatus as claimed in claim 1 wherein each adjusting arm comprises the piston rod of a slave hydraulic cylinder and each means to extend and retract an adjusting arm comprises a master hydraulic cylinder, each slave and master cylinder being connected by hydraulic conduits to conduct hydraulic fluid between the cylinders.

5. Apparatus as claimed in claim 4 including piston rods for the master cylinders adapted to be extended and retracted in predetermined fashion to cause extension and retraction of the slave hydraulic cylinder piston rods.

6. In an adjustable die for cutting a panel for men's trousers extending from the cuff to the waist, the combination including: a pair of upper waist-cutting knives, a pair of lower cuff-cutting knives and inseam- and outseam-cutting knives, the several knives being located in sliding, overlapping end relationship with one another to provide an essentially continuous cutting edge encircling a die area having the configuration of a panel for men's trousers; a rigid adjustment base member; a pair of knee-adjusting elements secured rigidly on opposite sides of the base member adapted to adjust the width of the die area at the knee level; a pair of hip-adjusting elements secured rigidly on opposite sides of the base member adapted to adjust the width of the die area at the hip level; upper and lower length-adjusting elements secured rigidly on the upper and lower ends of the base member adapted to adjust the length of the die area between the hip level and the waist and between the knee level and the cuff, respectively; a pair of cuff-adjusting elements adapted to adjust the width of the die area at the cuff; a pair of waist-adjusting elements adapted to adjust the width of the die area at the waist, each adjusting element comprising an extensible and retractable adjusting arm, the assemblage of base member and adjusting elements being located entirely internally of the die area and being connected to the cutting knives pivotally at the ends removed from the base member of the adjusting arms of the cuff-, knee-, hip-, and waist-adjusting elements, the waist-adjusting elements being secured rigidly at the end of the adjusting arm of the upper length-adjusting element and the cuff-adjusting elements being secured rigidly at the end of the adjusting arm of the lower length-adjusting element; and means to extend and retract the adjusting arms to cause sliding movement of the overlapping end sections of the cutting knives with respect to one another whereby adjustments of the dimensions of the encircled die area are effected essentially independently of one another.

7. Apparatus as claimed in claim 6 wherein each adjusting element is a slave hydraulic cylinder and each adjusting arm is the piston rod of the respective slave hydraulic cylinder and wherein, further, the means to extend and retract the piston rod of each slave hydraulic cylinder comprises a corresponding master hydraulic cylinder and piston rod and including, additionally, a pair of hydraulic conduits between each set of master and slave hydraulic cylinders for conveying hydraulic fluid between the cylinders whereby extension and retraction of the piston rod of the master cylinder by a predetermined amount causes the piston rod of the corresponding slave hydraulic cylinder to travel a distance sufficient to effect a desired adjustment of a dimension of the die area.

References Cited in the file of this patent

UNITED STATES PATENTS

| 1,049,599 | Prime | Jan. 7, 1913 |

FOREIGN PATENTS

| 245,350 | Germany | Aug. 5, 1910 |
| 292,080 | Germany | Aug. 25, 1914 |
| 474,263 | Italy | Sept. 13, 1952 |